United States Patent [19]

Nakamura et al.

[11] Patent Number: 4,618,377
[45] Date of Patent: Oct. 21, 1986

[54] METHOD FOR SURFACE TREATMENT OF ELECTRICAL STEEL SHEET

[75] Inventors: Motoharu Nakamura; Kikuzi Hirose; Tooru Sakamoto, all of Himeji, Japan

[73] Assignee: Nippon Steel Corporation, Tokyo, Japan

[21] Appl. No.: 785,750

[22] Filed: Oct. 9, 1985

[30] Foreign Application Priority Data

Feb. 9, 1985 [JP] Japan .................................. 60-22761

[51] Int. Cl.$^4$ ............................................ C23C 22/26
[52] U.S. Cl. .................................. 148/6.15 R; 148/6.2
[58] Field of Search ............................ 148/6.2, 6.15 R

[56] References Cited

U.S. PATENT DOCUMENTS

| | | | |
|---|---|---|---|
| 3,783,034 | 1/1974 | Kitayama | 148/6.2 |
| 3,793,073 | 2/1974 | Kitayama | 148/6.2 |
| 4,032,675 | 6/1977 | Irie | 148/6.2 |

FOREIGN PATENT DOCUMENTS

| | | |
|---|---|---|
| 49-19078 | 5/1974 | Japan . |
| 49-31026 | 8/1974 | Japan . |
| 50-15013 | 6/1975 | Japan . |
| 55-21111 | 6/1980 | Japan . |

Primary Examiner—Sam Silverberg
Attorney, Agent, or Firm—Kenyon & Kenyon

[57] ABSTRACT

The insulating film comprised mainly of phosphate or chromate is improved in its insulation property required for the laminated core e.g., a transformer, the blanking property required for manufacturing the core sections from the electrical steel sheet, and the lamination weldability. The organic resin particles used for controlling the surface roughness of the film are preliminarily treated with a dispersion improver, and then added to the emulsion resin, which is then mixed with the phosphate or chromate.

8 Claims, 5 Drawing Figures

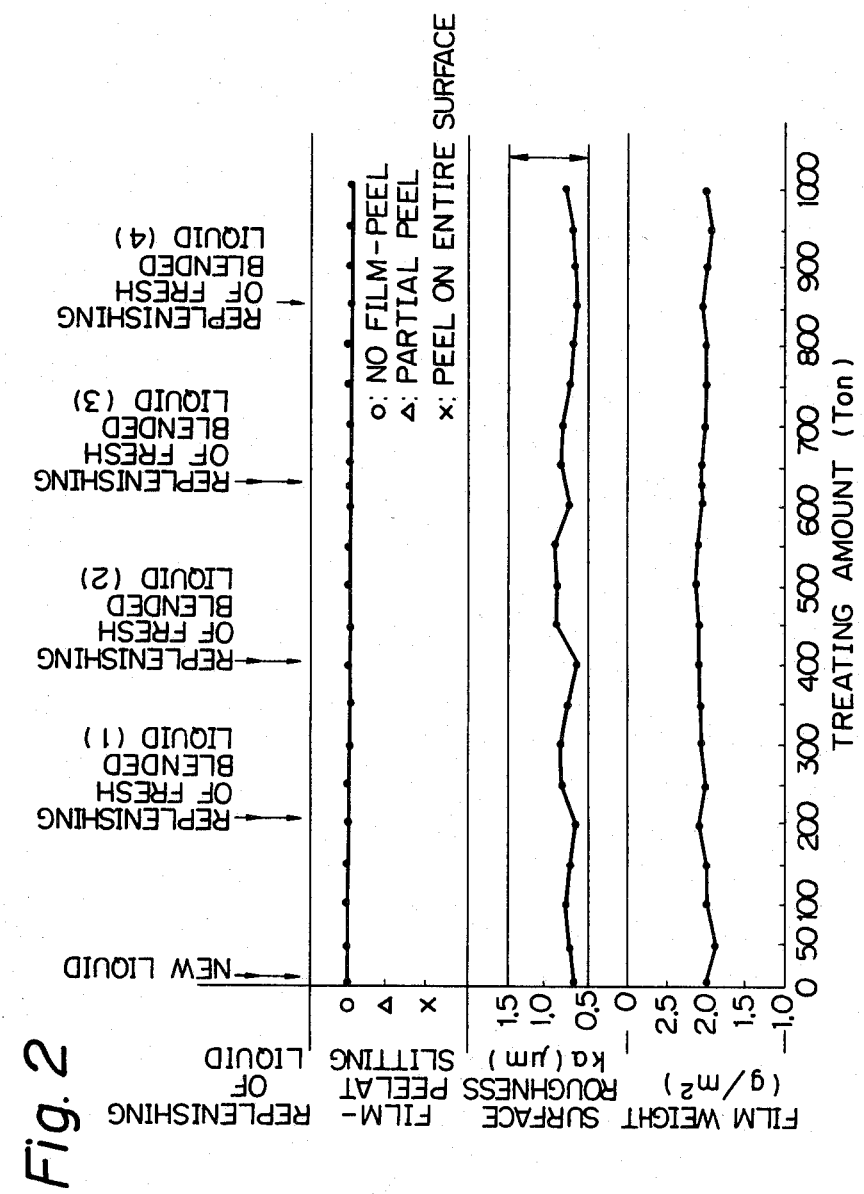

METHOD FOR SURFACE TREATMENT OF ELECTRICAL STEEL SHEET

BACKGROUND OF THE INVENTION

1. Field of the Invention

The present invention relates to a method for surface treatment of an electrical steel sheet for forming an electrically insulating film, which electrical steel sheet exhibits improved blanking property, lamination weldability, and electrical insulative characteristics.

2. Description of the Related Arts

To decrease the eddy current loss of electrical steel sheets, the sheet thickness is reduced and the sheets are provided with an insulating film on the surface thereof. In the manufacture of cores for motors for domestic electrical goods and transformers, the electrical steel sheets are continuously formed into blanks having the shape of a core, a predetermined number of the blanked sections are laminated together, and the edges of the resultant laminate core are fixed by welding. The insulating film is, therefore, required to exhibit not only an insulative property but also a member of other necessary properties, such as blanking capability, adhesion, lamination welding, heat resistance, and resistance against oil. It must also provide a high space factor. A number of patents disclose methods of forming the insulating film which allegedly satisfy these properties.

A known method, in which phosphate or chromate is used as components for forming an insulating coating, provides good heat-resistance and weldability but the blanking and adhesion properties are not satisfactory.

In another known method, which aims to improve the blanking property, organic matter, such as water-soluble resin or emulsion resin, is added to the inorganic treating agent such as phosphate and chromate. The added organic matter greatly improves the blanking property, but when the laminated sections are welded, the organic matter decomposes to yield gases. As a result, blow holes are formed in the weld bead. The weldability of the film formed by this known method is therefore very unsatisfactory.

Japanese Examined Patent Publication No. 49-19078 aims to satisfy both the blanking property and the weldability requirements and proposes to form on an electrical steel sheet an insulating film having a surface roughness $H_{max}$ of $2\mu$ or more. The $H_{max}$ of $2\mu$ more is expressed by an Ra (the center line average roughness stipulated in JIS B0601) of approximately 0.5 $\mu$m or more. The relationship between the surface roughness of an insulating film and the lamination weldability is explained hereinbelow with reference to FIG. 1.

BRIEF DESCRIPTION OF THE DRAWINGS

FIG. 2 illustrates a method for conveying a strip and results in Example 1; and

SUMMARY OF THE INVENTION

It is an object of the present invention to provide a method for surface-treating an electrical steel sheet, in which method the dispersion of organic resin particles in the treating agent is further enhanced, with the result that an insulating film can be formed substantially stably over a long period of time.

In accordance with the objects of the present invention, there is provided a method for forming on the surface of an electrical steel sheet an insulating film having an improved blanking property, lamination-weldability, and insulation property, wherein a mixture of an inorganic solution containing at least one of phosphate and chromate, and an emulsion resin solution, in which organic resin particles having a diameter of from 2 to 50 $\mu$m are preliminarily added, is applied on the surface of electrical steel sheet and is baked to form, on the surface of electrical steel sheet, an insulating film having a surface roughness Ra in the range of from 0.5 to 1.5 $\mu$m, characterized in that the organic resin particles are subjected to a surface treatment by a dispersion improver prior to their addition to the emulsion resin solution.

DESCRIPTION OF THE PREFERRED EMBODIMENTS

Figure 1:
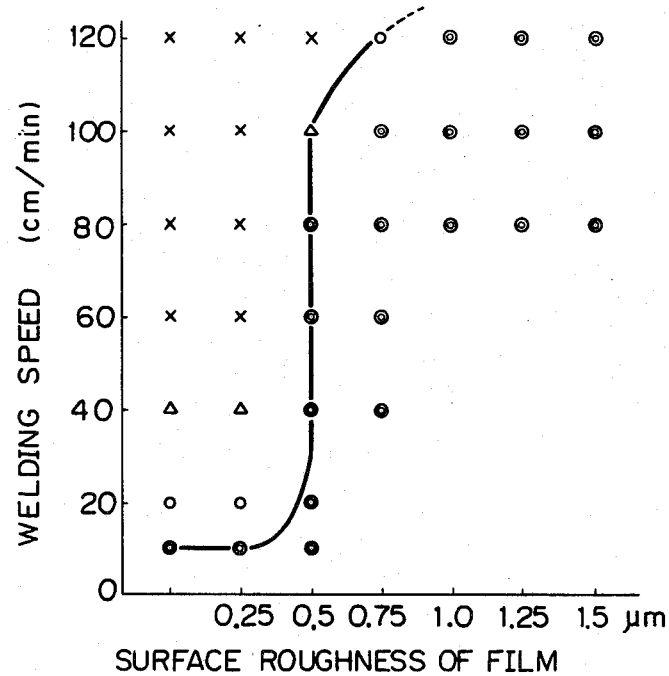
FIG. 1 shows a relationship between the surface roughness (Ra) of an insulating film formed on an electrical steel sheet and the lamination weldability.

Referring to FIG. 1, the following electrical steel sheet with an insulating film was used and the relationship between the surface roughness of the insulating film and the lamination weldability was judged by the following criteria.

(1) Steel Sheet—1.5% Si-containing electrical steel (2) Amount of insulating film—2 g/m$^2$ (the surface roughness varied in accordance with variations in the amount of powder resin)

(3) Criteria:
  ⊙—no blow holes;
  o—few blow holes
  △—several blow holes
on approximately half of the beads
  x—blow holes on all beads As is apparent from FIG. 1, when the surface roughness Ra of a film is Ra 0.5 $\mu$m, the lamination weldability is improved. This is because volatile gas generated during welding dissipates from the vicinity of the weld. When the surface roughness Ra is coarser than 0.5 $\mu$m, no blow holes will form even at a welding speed of 100 cm/minute, which is much higher than the conventional standard value of 60 cm/minute.

Japanese Examined Patent Publication No. 49-19078 describes the following three methods for imparting roughness on an insulating film: uniformly applying an organic film, baking the organic film, and roughening it, while still unhardened, with a roll having a predetermined roughness; applying an organic film on the steel sheet by means of a grooved roll, baking the organic film, and grooving the unhardened organic film with a grooved roll in a direction crossing that formed by the former grooved roll; and, incorporating organic resin particles having a size of approximately 2 $\mu$m into a treating agent, and then applying and baking the agent. The third method is the most industrially useful, but involves the problem of dispersion of the organic particles in the treating agent. When the dispersion is poor, an insulating film which stably retains a predetermined surface roughness over a long period of time cannot be formed. In addition, the organic particles tend to coagulate and form secondary particles, which exhibit poor adhesion to the steel sheet. The organic particles may be peeled from the steel sheet during the slitting of the sheet because at that time the sheet is held by tension pads or the like. In addition, not only the organic particles but also the insulating film may peel off. Another problem of the third method is the adhesiveness of the insulating film. The problems mentioned above arise merely because of the incorporation of the organic particles.

Japanese Examined Patent Publication No. 55-21111 proposes a technique which allegedly and advantageously overcomes the above mentioned problems and improves the dispersion of the organic particles as well as their adhesion to the steel sheet. This technique is related to a method for forming on the surface of an electrical steel sheet, a firm that is a mixture of an organic resin with one or more of phosphate and chromate, in which the surface roughness of the insulating film is controlled to 2 $\mu$Hmax–10 $\mu$Hmax by blending the organic particles into the treating liquid. This technique is characterized by preliminarily adding organic resin particles of 5 to 100 $\mu$m in diameter to the emulsion resin solution, uniformly dispersing them in the solution, mixing the solution containing the organic resin particles with the solution containing inorganic matter, such as phosphate and chromate, and then baking the mixture on the surface of electrical steel sheet for a short period of time at a temperature of from 400° C. to 700° C., thereby partially melting the organic resin particles and thus enhancing their adhesive force.

The present inventors tested the above method proposed in Japanese Examined Patent Publication No. 55-21111 and discovered a phenomenon wherein the dispersion state of the organic resin particles is not complete in the treating liquid, so that they partially coagulate in the treating liquid. The problems involved in Japanese Examined Patent Publication No. 55-21111 and to be solved are:

(a) when a number of electrical steel sheets are applied with the treating agent continuously for a long period of time, the surface roughness is likely to vary, for example, in such a manner that it is fine at an initial period and is rough at a later period; and, (b) the surface roughness is likely to vary at each preparation of the treating liquid.

These problems must be solved when applying the proposed method industrially.

The present invention which solves these problems will be now described in detail.

The inorganic solution used in the present invention contains at least one of the following components: phosphate of calcium, magnesium, zinc, and aluminum, chromate or bichromate of calcium, magnesium, zinc, and aluminum, and, oxide, hydroxide or carbonate of calcium, magnesium, zinc, and aluminum, which is dissolved in phosphoric acid or anhydrous chromic acid. (Refer to U.S. Pat. Nos. 3,783,034 and 3,793,073, which indicate the content of the components).

The emulsion resin, which can be used in the present invention, for dispersing the resin particles therein to enhance the adhesion on the steel sheet, is acrylic vinyl acetate, styrene, or butadiene alone, or a copolymer of one or more of vinyl acetate, styrene and butadiene, which copolymer is stably present at an acidic side.

The organic resin particles having a particle size of from 2 to 50 $\mu$m, which can be used in the present invention, are a copolymer or mixture of one or more of polyethylene, polypropylene, polyamide, benzoguanamine, polyacrylic resin, and polystyrene. Polystyrene and its copolymer is particularly preferred for the bonding strength.

The dispersion improver, which can be used in the present invention for the surface treatment of organic resin particles, is one or more of a nonionic surface-active agent, an anionic surface-active agent, a cationic surface-active agent, and an amphoretic surface-active agent.

The treating agent according to the present invention may comprise, in addition to the three components mentioned above, organic resin particles, emulsion resin, and an inorganic solution containing phosphate and/or chromate, a reducing agent such as glycerin and triethanolamine, and a glass-forming agent, such as colloidal silica, coloidal alumina, and boride.

The addition amount of the components to the inorganic solution is as follows. The total of the organic components content, i.e., the organic resin particles and the emulsion resin, is preferably from 3 to 200 parts relative to 100 parts of the inorganic components, i.e., phosphate and chromate. When the organic components content is less than 3 parts, the blanking and adhesive properties are unsatisfactory, and when the organic components are in an amount of more than 200 parts, the heat resistance is unsatisfactory, and hence, the insulating film tends to peel during stress relief annealing of the electrical steel sheet. The proportion of the organic resin particles and emulsion resin in the total organic components is preferably such that the former amounts to from 5 to 60%. At a percentage of less than 5%, it is difficult to control the surface roughness of a baked film to within the range of from Ra 0.5 $\mu$m to 1.5 $\mu$m, and hence, it is difficult to obtain an improved weldability. At a percentage of more than 60%, a uniform dispersion is difficult to obtain, so that the insulating film exhibits large teeth, or roughness, and a poor adhesion property to the steel sheet, and the space factor lessens. The reducing agent, such as glycerine and the like, is preferably in an amount of from 0.5 to 30 parts, and the glass-forming agent, such as colloidal silica, is preferably in an amount of from 0.5 to 30 parts.

The dispersion of the organic resin particles having a diameter of from 2 $\mu$m to 50 $\mu$m is improved by a surface-pretreatment using the dispersion improver, for example, as follows. A predetermined amount of the dispersion improver is added to the organic resin particles at the step of crushing the organic resin by means of a crusher, a ball mill, grinding machine, or the step for classifying the crushed organic resin particles by means of a vibration sieve, a venturi, a cyclone, or the like. The dispersion improver is sprayed over or dropped onto the organic resin and is then mixed with the organic resin.

The amount of the dispersion improver varies depending upon the surface nature of the particular organic resin used, but is preferably from 0.05 to 5 parts based on 100 parts of the organic resin particles. At an amount of less than 0.05 parts, it is difficult to stably provide a satisfactory dispersion, so that secondary particles which are occasionally formed by coagulation lead to a nonuniform surface roughness of a baked film, large teeth, or roughness. As a result, the adhesion of insulating film to a steel sheet occasionally becomes unsatisfactory and the space factor lessens. On the other hand, at an amount of more than 5 parts, violent foaming occurs, and when the treating agent is applied on a steel sheet by a roll, the organic resin particles may be caught-up by the roller, and the surface roughness of the applied film becomes nonuniform.

The organic resin particles, which have been subjected to the surface treatment by the dispersion improver as described above, are added to and are dispersed in the emulsion-resin solution. As a result, the organic resin particles are covered with the emulsion resin, and hence, their dispersion is further enhanced. The emulsion resin which covers the organic resin particles, acts as a binder for binding the particles to the steel sheet, which contributes to an enhancement of the adhesion property of an insulating film. Furthermore, the applied agent is baked under a controlled condition such that the organic resin particles having a diameter of from 2 to 50 $\mu$m retain the semimolten state so as to attain the film surface roughness Ra in the range of from 0.5 to 1.5 $\mu$m. This also contributes to enhancing the adhesion property. Due to the binder effect and controlled surface roughness, the insulating film according to the present invention is more adhesive to the steel sheet than known films in which merely an addition of organic resin particles carried out. In this connection, when the organic resin particles used have a particle diameter of less than 2 $\mu$m, it is difficult to carry out the semimelting in such a manner that the insulating film has a surface roughness Ra of 0.5 $\mu$m or more. When the organic resin particles used have a particle diameter of more than 50 $\mu$m, the dispersion and the space factor are impaired. In addition, the surface roughness of the film, which is semimelted during melting, occasionally exceeds 1.5 $\mu$m, with the result that there is a danger of film peeling occurring during slitting, due to the contact between a pad and the film.

As described above, the organic resin particles, which have been surface-treated with the dispersion improver, are uniformly dispersed in and mixed with the emulsion-resin solution. The resultant mixture is mixed with the inorganic solution and is then applied on the surface of an electrical steel sheet, by a roll coater or the like, in a predetermined amount. The applied mixture is baked at a baking temperature of from 250° C. to 700° C. for a short period of time. The baking at a high temperature provides a more stable film-roughness than does the baking at a low temperature. Nevertheless, the baking at temperature lower than 250° C. requires a long heating time and is industrially unacceptable, while the baking at a temperature of more than 700° C. makes control of the semimelting state and the required surface roughness difficult.

An appropriate weight amount of insulating film formed on the surface of the electrical steel sheet is in the range of from 0.5 g/m$^2$ to 5 g/m$^2$. At an amount of less than 0.5 g/m$^2$, the blanking property is unsatisfactory, and at an amount of more than 5 g/m$^2$, there is a danger that the insulating film will peel during the stress relief annealing. A particularly preferred weight amount is in the range of from 1.0 g/m$^2$ to 2.5 g/m$^2$. In this range, an excellent blanking property, lamination-weldability, and heat-resistance of the insulating film are attained.

As described above, the present invention is an improvement of the known method using the organic resin particles and involves attainment of the following advantages: drastically improved dispersion of the organic resin particles in the treating agent; improved blanking property; improved laminatron-weldability; improved electrical insulation; and, a stable industrial production of an insulating film having improved properties, over a long period of time.

In the most industrial form of the present invention, the electrical steel sheet is in the form of a coil usually weighing from 3 to 30 tons, and the following step (d) is performed for approximately 200 tons of coils, and the steps (a)–(e) are repeated for another approximately 200 tons of coil, thereby attaining virtually constant values of the surface roughness Ra and the weight of insulating film over the whole tonnage of treated coils.

The steps for forming an insulating film on an electrical steel sheet, comprises:

(a) surface-treating organic resin particles having a diameter of from 2 $\mu$m to 50 $\mu$m with a predetermined amount of dispersion improver;

(b) adding a predetermined amount of said surface-treated organic resin particles into an emulsion resin solution;

(c) mixing a predetermined amount of said emulsion resin solution, into which said surface-treated organic resin particles are added and dispersed, with a solution containing an at least one inorganic component selected from the group consisting of phosphate and chromate;

(d) applying a predetermined amount of the obtained mixture in step(c) on a surface of the electrical steel sheet; and, (e) baking the applied mixture at a temperature at which the organic resin particles are semimelted and provide a surface roughness Ra in the range of from 0.5 $\mu$m to 1.5 $\mu$m.

The present invention is further explained with reference to the following examples and comparative examples.

EXAMPLE 1

The electrical steel sheets used in this example contained 1.5% of Si, had a thickness of 0.5 mm and a width of 960 mm, and a surface roughness Ra of 0.22 $\mu$m. The treating agent A, described below, was applied on the electrical steel sheets, squeezed by a rubber roll, and then baked for 40 seconds in a furnace held at 450° C. After every treatment of from 200 to 250 tons of electrical steel sheets a fresh treating agent A was prepared and then replenished into the tank. A continuous treatment of 1000 tons of electrical steel sheets was carried out. FIG. 2 shows the properties of the baked film, i.e., weight amount, surface roughness, and film peeling during slitting. As is apparent from FIG. 2, in the present examples, the weight of the film is from 1.9 to 2.2 g/m$^2$ and is virtually constant, the variance of surface roughness Ra falls within the range of from 0.6 to 0.9 $\mu$m and is small, even after replenishing the newly blended liquid, and no film-peeling occurred at all in the slitting.

Figure 3:
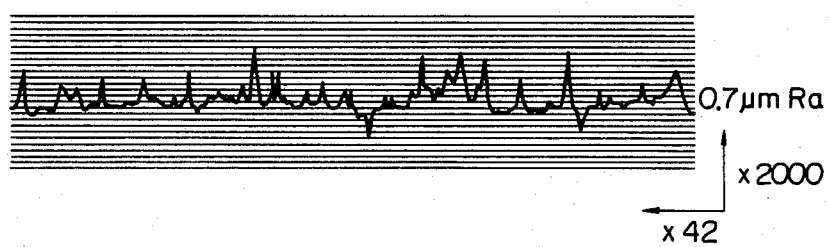
FIG. 3 shows an example of the surface roughness obtained in Example 1.

A part of the insulating film was subjected to measurement of the surface roughness thereof by using a contact-probe type-surface roughness tester. The result is shown in FIG. 3.

The electrical steel sheets treated as described above were blanked into core sections by means of a continuous blanking machine with dies made of SKD-1. A light oil was used as for lubrication, and 250 blanks per minute were produced. Two million blanks could be produced before a burr 50 $\mu$m in size formed on the edges of the blanks from the electrical steel sheet. The blanked core sections were laminated and the TIG welded. The TIG welding conditions were: current 120A; electrode—a Th-W electrode 2.4 mm in diameter; flow rate of argon—6 l/minute; and, squeezing pressure—50 kg/cm². The welding speed was varied. No blow holes were found, and defect-free beads were formed at a welding speed up to 100 cm/min.

The insulation resistance of the electrical steel sheets treated as described above was measured according to the JIS second method. The resistance was 150 Ω-cm² per sheet, demonstrating an excellent insulation property.

Specimens were taken from the electrical steel sheets treated as described above, and these specimens were stress-relief annealed at 750° C. for 2 hours in $N_2$. Peeling of the insulating films was then investigated. Neither peeling nor sticking of film occurred. The insulation resistance was a high 85 Ω-cm² per sheet.

TREATING AGENT A

I.

(a) powder of polyethylene resin (18 μm in diameter), surface-treated with 2% nonionic surface active agent—20 kg (b) copolymer (50% acrylic vinyl acetatestyrene) emulsion resin—40 kg After mixing (a) and (b), I was added to II.

| II. | |
| --- | --- |
| (c) $H_2O$ | 1000 kg |
| (d) $CrO_3$ | 100 kg |
| (e) MgO | 20 kg |
| (f) $H_3BO_3$ | 10 kg |

COMPARATIVE EXAMPLE 1

Figure 4:
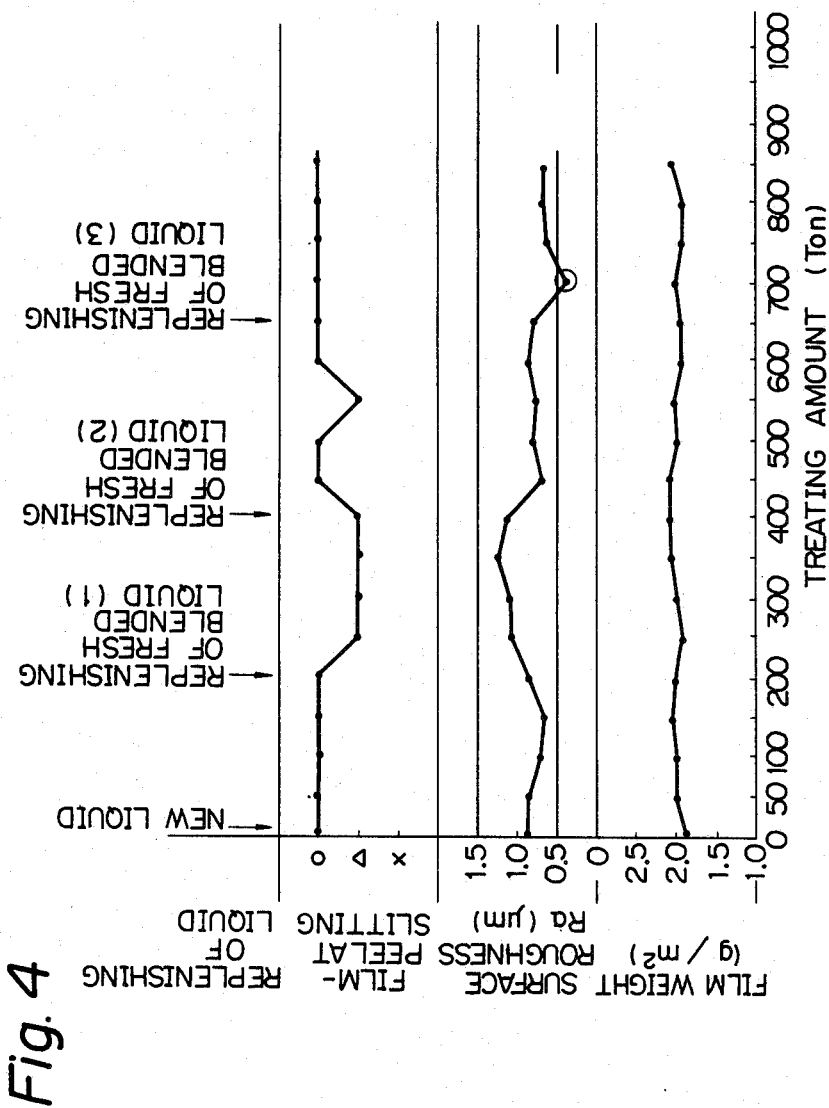
FIGS. 4 and 5 show the results of conveying a strip through a production in Comparative Example 1 and Example 2, respectively.

The electrical steel sheets used in this example contained 1.5% of Si, had a thickness of 0.5 mm and a width of 960 mm, and a surface roughness Ra of 0.22 μm. The treating agent B, described below, was applied on the electrical steel sheets, squeezed by a rubber roll, and then baked for 40 seconds in a furnace held at 450° C. After treatment of from 200 to 250 tons of electrical steel sheets, a fresh treating agent B was prepared and then replenished. A continuous treatment of 850 tons of electrical steel sheets was carried out. FIG. 4 shows the properties of the baked film, i.e., weight amount, surface roughness, and any film peeling during slitting. As is apparent from FIG. 4, the weight is not inferior to Example 1. But, the surface roughness varied at each replenishment within a broad range of from Ra 0.4 to 1.25 μm. The films were partly peeled at several locations where secondary particles had formed due to coagulation.

TREATING AGENT B

I.

(a) powder of polyethylene resin (18 μm in diameter)—20 kg (b) copolymer (50% acrylic vinyl acetatestyrene) emulsion resin—40 kg After mixing (a) and (b), I was added to II.

| II. | |
| --- | --- |
| (c) $H_2O$ | 1000 kg |
| (d) $CrO_3$ | 100 kg |
| (e) MgO | 20 kg |
| (f) $H_3BO_3$ | 10 kg |

EXAMPLE 2

Figure 5:
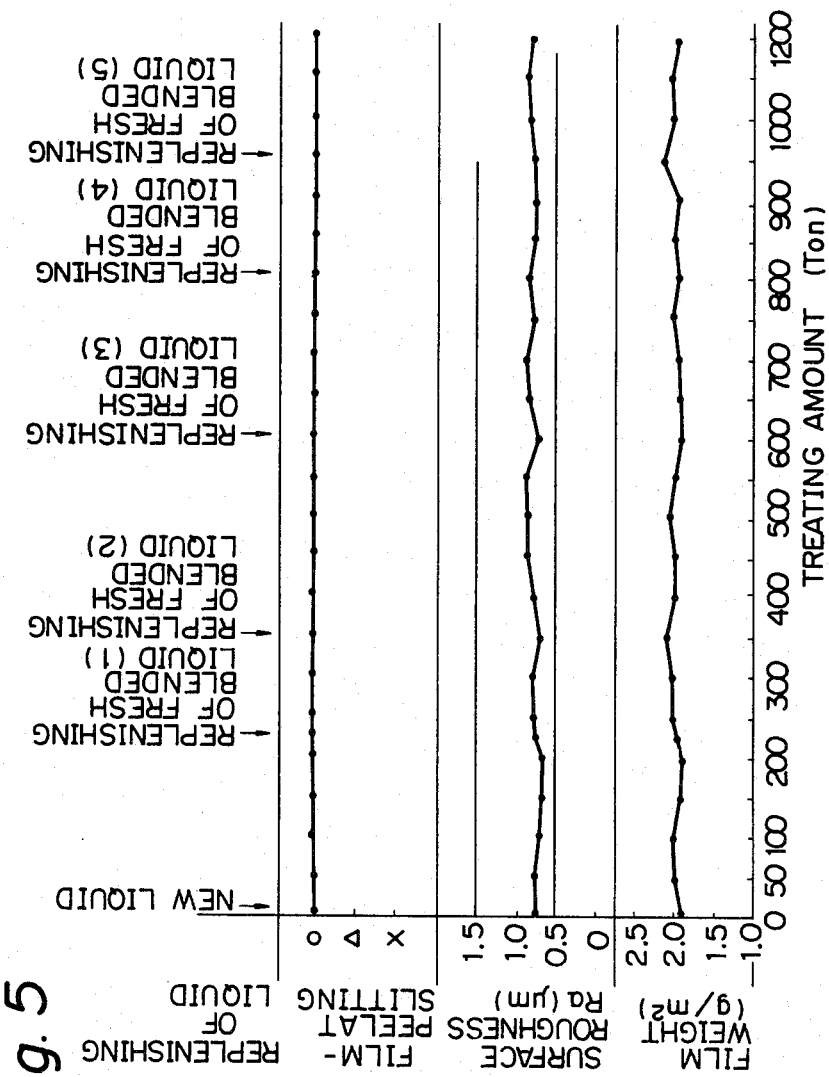

The electrical steel sheets used in this example contained 0.5% of Si, had a thickness of 0.5 mm and a width of 960 mm, and a surface roughness Ra of 0.18 μm. The treating agent C, described below, was applied on the electrical steel sheets, squeezed by a rubber roll, and then baked for 30 seconds in a furnace held at 500° C. After treatment of from 150 to 250 tons of electrical steel sheets, a fresh treating agent C was prepared and then replenished into the tank. A continuous treatment of 1100 tons of electrical steel sheets was carried out. FIG. 5 shows the properties of the baked film, i.e., weight amount, surface roughness, and any film peeling during slitting. As is apparent from FIG. 5, in the present examples, the weight of the film is from 1.9 to 2.2 g/m² and is virtually constant, the variance of the surface roughness Ra falls within the range of from 0.6 to 0.9 μm and is small, and no film-peeling occurred at all in the slitting.

The same blanking test, and lamination-welding test as in Example 1 were carried out using the specimens taken from one of the coils after the total tonnage treated amounted to 120 tons. Two million, two hundred thousand blanks could be produced before a burr 50 μm in size formed on the edges of the blanks from the electrical steel sheet. No blow holes were found and defect-free beads were formed at a welding speed of 140 cm/min or less. The insulation resistance measured according to the JIS second method was 150 Ω-cm² per sheet, demonstrating an excellent insulation property.

Specimens were taken from the electrical steel sheets treated as described above, and these specimens were stress-relief annealed at 750° C. for 2 hours in N2. Peeling of the insulating films was investigated. Neither peeling nor sticking of the film occurred. The insulation resistance was a high 70 Ω-cm² per sheet.

TREATING AGENT C

I.

(a) powder of copolymer of polyethylene resin and polypropylene resin (20 μm in diameter), surface-treated with 1% non-ionic surface active agent—20 kg (b) copolymer (50% acrylic resin-vynil acetate) emulsion resin—40 kg After mixing (a) and (b), I was added to II.

| II. | |
| --- | --- |
| (c) $H_2O$ | 1000 kg |
| (d) $CrO_3$ | 100 kg |
| (e) ZnO | 40 kg |

We claim:

1. A method for forming an insulating film on an electrical steel sheet, comprising the steps of:
   (a) surface-treating organic resin particles having a diameter of from 2 μm to 50 μm with a predetermined amount of dispersion improver;
   (b) adding a predetermined amount of said surface-treated organic resin particles into an emulsion resin solution;
   (c) mixing a predetermined amount of said emulsion resin solution, into which said surfacetreated organic resin particles are added and dispersed, with a solution containing an at least one inorganic component selected from the group consisting of phosphate and chromate;

(d) applying a predetermined amount of the obtained mixture in step(c) on a surface of the electrical steel sheet; and, (e) baking the applied mixture at a temperature at which the organic resin particles are semimelted and provide a surface roughness Ra in the range of from 0.5 μm to 1.5 μm, thereby enabling a stable formation of an insulating film having improved blanking and insulation properties and weldability, over a long period of treatment time.

2. A method according to claim 1, wherein the dispersion improver is at least one selected from the group consisting of a nonionic surface active agent, an anionic surface-active agent, a cationic surface-active agent, and an amphoretic surface-active agent.

3. A method according to claim 1, wherein the amount of dispersion improver is from 0.05 to 5 parts relative to 100 parts of the organic resin particles.

4. A method according to claim 3, wherein the total amount of the organic resin particles and emulsion resin is from 3 to 200 parts relative to 100 parts of the inorganic components.

5. A method according to claim 4, wherein the organic resin particles are in an amount of from 5 to 60% based on the total of organic resin particles and the emulsion resin.

6. A method according to claim 1, wherein the baking temperature is from 250° to 700° C.

7. A method according to claim 1, wherein the amount applied in step (d) is such that an insulating film having weight in the range of from 0.5 g to 5 g per m² of the sheet is formed in step (e).

8. A method according to claim 7, wherein the electrical steel sheet is in the form of a coil weighing from 3 to 30 tons, and further comprising a step (f) of performing the step (d) for approximately 200 tons of coils, and a step of repeating the steps (a)–(e) for another approximately 200 tons of coil, thereby attaining virtually constant values of the surface roughness Ra and the weight of insulating film over the whole tonnage of treated coils.

* * * * *